Jan. 4, 1944.  W. R. WICKERHAM  2,338,557
SYNCHRONOUS MOTOR CONTROL
Filed Aug. 11, 1942  2 Sheets-Sheet 1

WITNESSES:

INVENTOR
William R. Wickerham.
BY
Paul E. Friedemann
ATTORNEY

Patented Jan. 4, 1944

2,338,557

UNITED STATES PATENT OFFICE 2,338,557

SYNCHRONOUS MOTOR CONTROL

William R. Wickerham, Swissvale, Pa., assignor to Westinghouse Electric & Manufacturing Company, East Pittsburgh, Pa., a corporation of Pennsylvania Application August 11, 1942, Serial No. 454,359

7 Claims. (Cl. 172—289)

My invention relates to motor control systems and more particularly to systems of control for effecting the starting and resynchronizing of a synchronous motor.

One of the important problems in the starting of synchronous motors is to effect synchronization with no, or at least a minimum, line disturbance, a minimum of shock to the load connected to the motor, and to effect maximum pull-in torque.

Numerous attempts have heretofore been made by others and I have devised equipment to solve this problem and with some measure of success, however, when time limit control alone is used, the poorest pull-in torque and the worst line disturbance cannot be avoided. On the other hand, when armature current variations alone are used, the same disadvantage exists plus the fact that the slip at synchronization will usually be higher than desired. In either case, at one starting the severe line disturbance may be had whereas at the next starting, it may be satisfactory. According to probabilities, the starting may be as desired only half the time.

One object of my invention is to provide, in a simple control, for maximum pull-in torque and minimum line disturbance for every starting of a synchronous motor.

Another object of my invention is to obtain the advantages of both time-limit starting of a synchronous motor and speed responsive starting of a synchronous motor.

A more specific object of my invention is to synchronize a synchronous motor with maximum pull-in torque when the synchronous motor has made a substantially fixed number of revolutions after having obtained a given speed during acceleration.

Another object of my invention is to avoid synchronization of a synchronous motor any where near the unfavorable angle of synchronization.

A still further object of my invention is to avoid synchronization of a synchronous motor anywhere near the unfavorable angle of synchronization even when synchronization is to be effected at a high slip.

A still further object of my invention is to make the synchronization of a synchronous motor, once the correct angle for field application has been picked by my control, substantially independent of the speed of contactor operation.

It is also an object of my invention to effect resynchronization of a synchronous motor, in case of pull-out, in the novel manner produced by my invention.

Other objects and advantages will become more apparent from a study of the following specification when done in conjunction with the accompanying drawings, in which.

Figure 1:
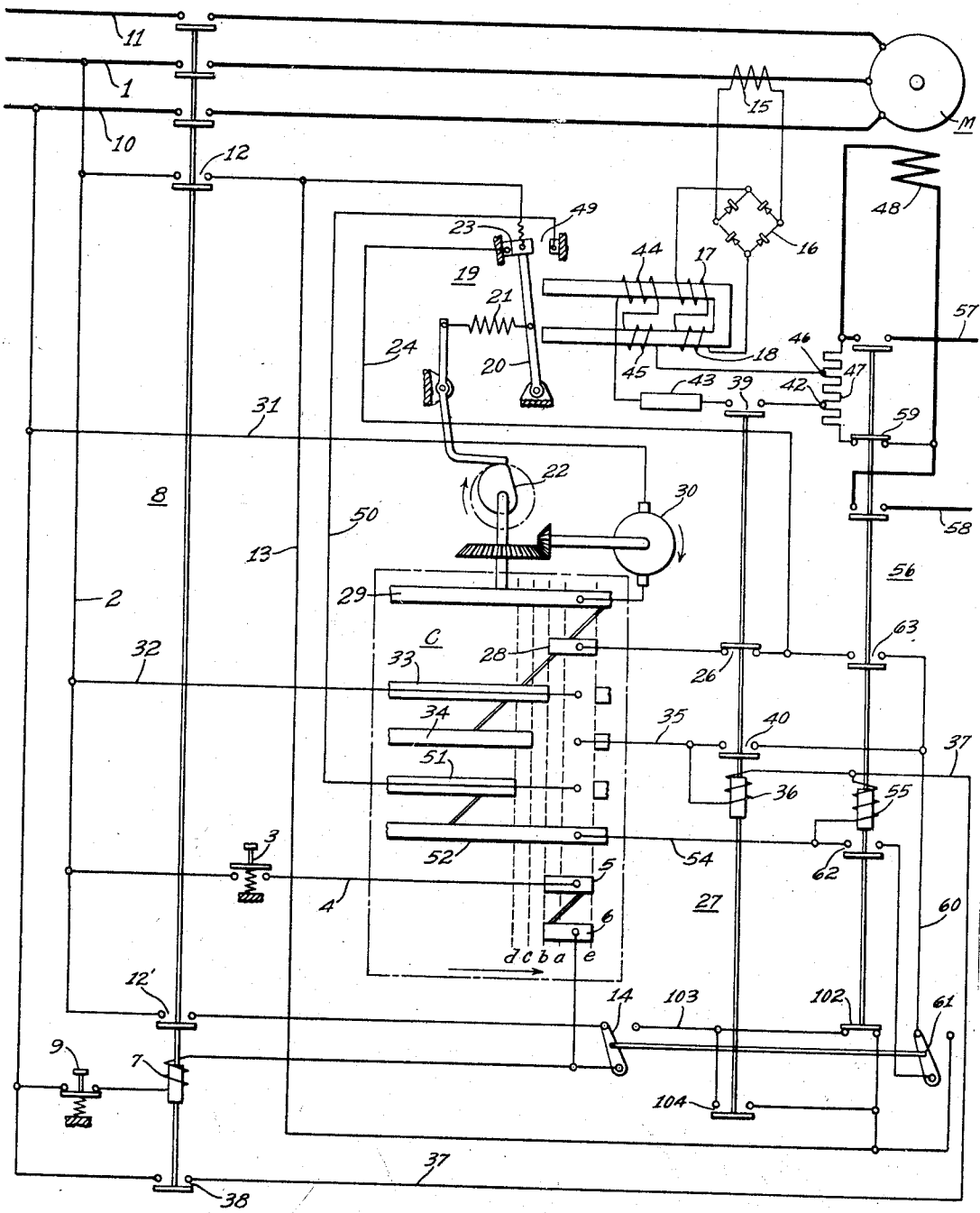
Figure 1 is a diagrammatic showing of my invention of control as applied to a synchronous motor.

In Fig. 1, M designates the synchronous motor, which is of conventional design, having an armature winding, a damper, or starting winding, and a field winding. The main switch, or line contactor, is designated by 8 and the field switch by 56. The field switch is controlled by the timing device 30 and the controller C operated thereby. The proper time of operation of the field contactor is further controlled by contactor 27, and the device generally designated by reference character 19.

The function of the various devices that enter into a synchronous motor starting control embodying my invention may be best understood from a study of a starting cycle.

If the attendant wishes to start the synchronous motor, assuming that the buses 1, 10 and 11 are energized with alternating current and the buses 57 and 58 are energized with direct current, he actuates the start button 3 whereupon a circuit is established from bus 1 through conductor 2, start button 3, conductor 4, controller segments 5 and 6, the actuating coil 7 of the line contactor 8, the stop button 9 to bus 10. From this circuit it will be apparent that starting can only be effected when the controller C is in the proper off position.

Operation of the line contactor 8 connects the motor M to buses 1, 10 and 11 to start the motor as an induction motor and also establishes a holding circuit for itself. This circuit may be traced from the conductor 2, through contact members 12, the automatic re-synchronizing switch 14, if in the position shown, to coil 7. The motor operation thus continues independent of the position of the start switch 3.

During the initial starting stages the load current is heavy and as a consequence the output of the current transformer 15 is high. The output terminals of this current transformer are connected to the full-wave rectifier 16. The direct current delivered by the rectifier will vary with the load current and in addition will be pulsating, as is well known, with a frequency that is twice that of the slip frequency. The output of rectifier 16 is supplied to coils 17 and 18 of the relay 19.

This relay 19 has its magnetic circuit and the turns of coils 17 and 18 so selected that it is not affected to cause vibration of its armature 20 by the high frequency pulsations but a magnetomotive force and thus a magnetic pull on armature 20 is produced that varies with the load current. The relay has a spring 21 that biases the armature to the position shown by a force that is determined by the position of the cam 22.

During the initial starting stages cam 22 will be in the position shown and will thus bias armature 20, to the position shown, with a maximum force. This force is indicated by the indicia, Relay spring tension, shown in Fig. 2. Since the Relay magnetic pull (see Fig. 2) during the initial stages of starting is greater than the Relay spring tension, the armature 20, almost instantly after the operation of the line contactor 8, will pick up to open contact members 23. The opening of contact members 23 prevents, at this stage, the establishment of any operating circuits for the timing device 30. This timing device 30 may be any suitable motor means which, when energized, operates the controller C and the cam 22 at a constant speed.

As long as the load current is above a given value, as $P_1$, the relay armature remains in the operated position. The motor starting control during this stage is thus truly current limit acceleration, since the period from P to $P_1$ may vary with starting current conditions. At point $P_1$ the relay armature drops back to the position shown.

The drop-out of relay armature 20 closes contact members 23 to close an energizing circuit for the time device 30. The energizing circuit for device 30 may be traced from bus 1 through contact members 12, contact members 23, conductor 24, back contact members 26 of the control contactor 27, segments 28 and 29 of the controller C, timing device 30, and conductor 31 to bus 9.

As the timing device actuates the controller segments through the $a$ position to the $b$ position, a circuit is established which circuit may be traced from bus 1 through conductor 32, controller segments 33, 28, and 29, the timing device 30 to energized conductor 31. This means that the timing device 30 is no longer dependent upon the closed condition of contacts 23 and 26 but will continue to operate for its entire cycle until all the segments are again in the position shown.

When the controller moves to the $c$ position, a circuit is established from energized segment 33 through segment 34, conductor 35, actuating coil 36 of control contactor 27, conductor 37, contact members 38 of the line contactor to bus 10. As soon as control contactor 27 is thus energized, the time limit acceleration control of the motor ends.

The period of time limit acceleration control may be adjusted by suitably adjusting segment 34 with reference to segment 33. Usually, the adjustments of the tension of spring 21, the position of cam 22 on the controller shaft and the position of segment 34 on the controller shaft with reference to the position of segment 33 on the same shaft is such that the motor is somewhere near synchronous speed, that is, is operating at no more than, say six percent slip, for a heavily loaded motor, but preferably at one or two percent slip, when the total period of current limit acceleration and time limit acceleration has expired.

Operation of the control contactor closes contact members 39, 40 and 104 and opens contact members 26. Closure of the contact members 39 establishes a circuit from junction 42, through contact members 39, phase shifter 43, if needed, but which is seldom the case, coils 44 and 45 of relay 19 to junction 46. Junctions 42 and 46 are suitable points on the field discharge resistor 47 normally and for well known reasons used in the field discharge circuit of the motor field, as 48.

As is well known, during induction motor operation the motor field 48 has induced therein an alternating current proportional to slip. In fact the frequency of this current in the field, induced by transformer action, is commonly called the slip frequency. The current thus flowing in coils 44 and 45 is alternating current normally in phase with the slip frequency current.

Figure 2:
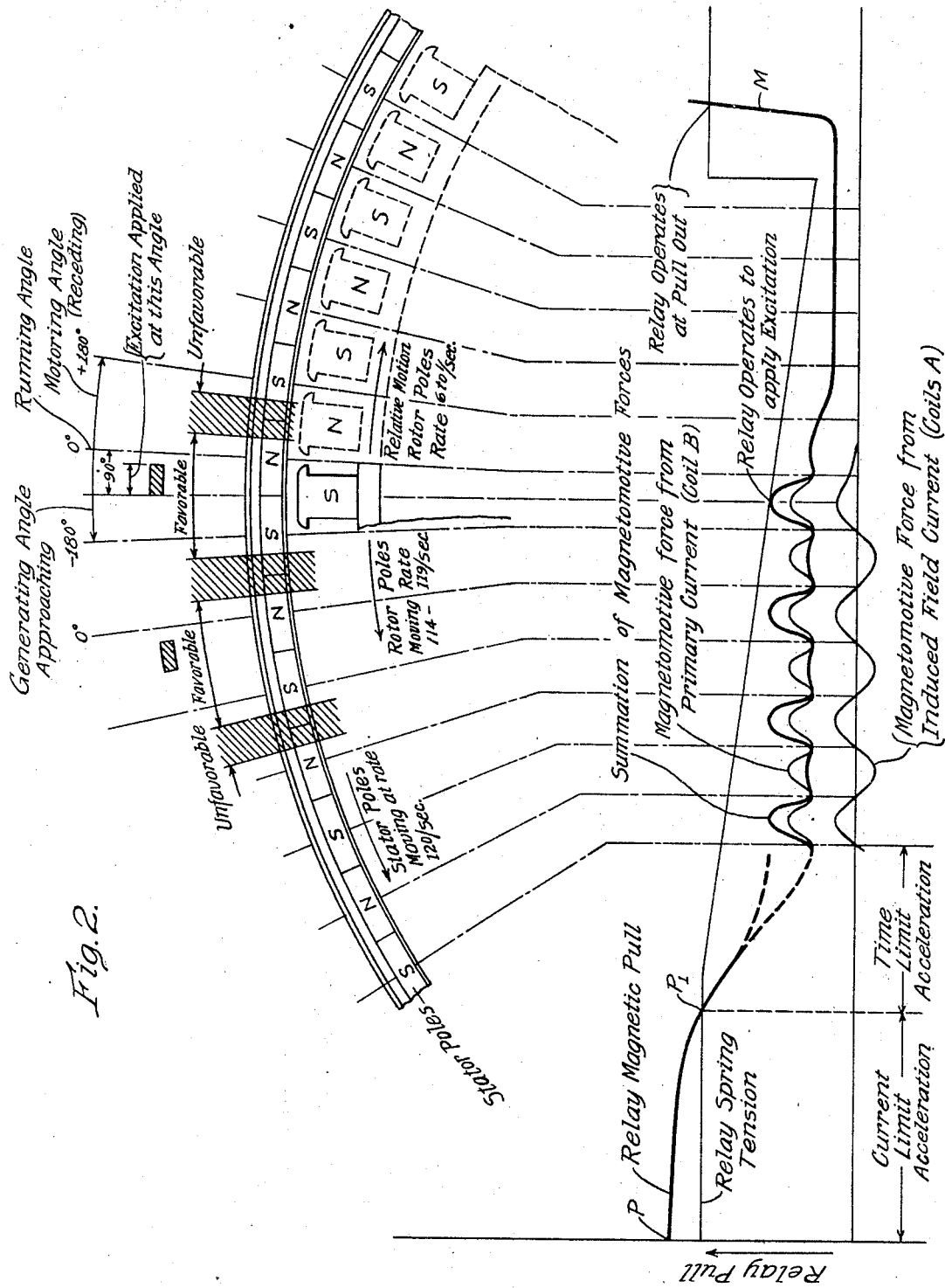
Fig. 2 shows some curves in relation to operating positions of the field poles and rotating field of a synchronous motor, which subject matter facilitates the description of my invention.

Coils 44 and 45 thus produce a magnetomotive force from induced field current shown by the curve so designated in Fig. 2. The current in the coils 17 and 18 is a direct current that varies, as heretofore pointed out, with a frequency that is twice that of the slip frequency. From numerous tests and the oscillographic records made during such tests, I have found that the direct current taken from a rectifier, as 16, for most synchronous motors of conventional design, varies from one minimum through a maximum back to a second minimum substantially in phase with one-half cycle, say the positive, of the slip frequency current and then from the second minimum through a maximum back to a third minimum substantially in phase with the second half-cycle, say the negative, of the slip frequency current. If this condition does not exist, it can readily be obtained by means of a phase shifter as 43.

By properly winding the coils 17 and 18 with respect to coils 44 and 45, the magnetomotive force of the relay may be caused to vary as shown in Fig. 2 by the heavy curve designated Summation of Magnetomotive Forces. It should be noted that this force passes through high values for all the first successive alternate 180 electrical degrees and remains at a substantially constant low value for all the second successive alternate 180 electrical degrees. Further, by the proper arrangement of the windings, as shown, the high force values only occur during the favorable 180 electrical degrees—favorable for a high pull-in torque if the motor synchronization is initiated during this time.

Since the operation of cam 22 is continued by the timing device, the spring tension of spring 21 is being gradually reduced. Also the controller C soon after the operation of control contactor 27 closes a portion of a circuit at controller segments 51 and 52. As soon as the spring tension is low enough the relay armature 20 is picked up to close contact members 49 to close a circuit that may be traced from bus 1 through contact members 12 and 49, conductor 50, controller segments 51 and 52, conductor 54, actuating coil 55 of the field contactor 56 to the energized conductor 37.

The field contactor is thus operated almost instantaneously and the field winding 48 is thus connected to the buses 57 and 58 and a moment later the discharge circuit for the field is opened at contact members 59. The motor thus pulls into synchronism with a maximum pull-in torque. From Fig. 2 and the indicia thereon, it will be apparent that the field is not only applied during the most favorable half of the cycle but is actually applied at a time when very near maximum pull-in torque can be obtained. There is thus no need for the provision of special refinements to adjust the time constants of relay 19 or the field contactor 56, or both. I have thus provided simple and reliable equipment for invariably effecting the motor synchronization at maximum pull-in torque.

Operation of the field contactor also establishes its own holding circuit. This circuit may be traced from, energized controller segment 34, the closed contact members 40, conductor 60, resynchronizing switch 61 and contact members 62, and coil 55 to the energized conductor 37.

The moment synchronization is complete relay 19 is deenergized and contact members 23 reclose. This establishes another holding circuit for the field contactor coil 55. This circuit may be traced from bus 1 through contact members 12 and 23, conductor 24, and closed contact members 63 to the energized conductor 60. Since this portion of the holding circuit just traced is in parallel to segments 33 and 34 of the first holding circuit, it is apparent that, as soon as the controller segments have moved to the off position shown, the only holding circuit for both coils 36 and 55 is through the contact members 23.

After synchronization is complete the controller moves to the off position. If now at any time during motor operation the motor pulls out of step for some cause, the relay 19 will be subjected to a high operating force for a short time because of such pull-out and contact members 23 will thus open. The field contactor 56 will thus disconnect the field 48 from buses and the discharge circuit will be reestablished, and the control contactor 27 will close its contact members 26.

As soon as the field is disconnected from the buses 57 and 58, the heavy surges of armature load current of motor M cease and since the spring tension of spring 21 is a maximum the relay 19 will again close its contact members 23. This means that the timing device 30 is again energized through the circuit from bus 1, contact members 12 and 23, conductor 24, contact members 26, segments 28 and 29, timing device 30, conductor 31, to bus 9. The synchronizing is thus repeated, that is, the motor is resynchronized.

If it is not desirable to have automatic resynchronization then the interconnected switches 14 and 61 are thrown to the dotted line position. When these switches are in the dotted line position, the initial starting sequence is somewhat different. The operation is then, briefly stated, as follows:

After the operation of the line contactor 8, its own holding circuit is from bust 1 through contact members 12, conductor 13, back contact members 102, conductor 103, automatic trip position of switch 14, coil 7 of line contactor 8, stop button 9, to bus 10.

The various operating steps are now the same as previously discussed up to the end of the time limit acceleration which is determined by the operation of control contactor, or relay 27. When this contactor operates it closes its contact members 104 shunting contact members 102. Later opening of contact members 102 thus does not interrupt the holding circuit for coil 7 of the line contactor 8.

When the synchronization is completed and the controller segments are again in the off position, the holding circuit for coil 36 of control contactor 27 is the same as before but the holding circuit for coil 55 of the field contactor 56 is from bus 1 through contact members 12, conductor 13, switch 61 in the automatic trip position, contact members 62, and coil 55 to energized conductor 37.

In the event of a pull-out coil 36 will be deenergized and contact members 104 in the holding circuit for coil 7 will open, and, since contact members 102 are still open, the line contactor will disconnect the motor from buses 1, 10 and 11.

The line contactor will also open contact members 12 and 38 thereby deenergizing coil 55 of the field contactor. The field 48 is thus also disconnected from its buses 57 and 58.

From the foregoing it is apparent that I have provided simple and reliable and relatively inexpensive means for effecting angle switching of a synchronous motor. However, I do not wish to be limited to the particular circuits shown but wish to be limited only by the scope of the claims hereto appended.

I claim as my invention:

1. In a starting system for a synchronous motor, in combination, a synchronous motor having an armature, or primary, winding, a field winding, and a damper winding, a source of alternating current, means for connecting the motor armature winding to said source of alternating current, a source of direct current, field switching means for connecting the motor field winding to the source of direct current to synchronize the synchronous motor, control means for synchronizing said synchronous motor, said control means including means for producing a magnetomotive force that varies with the frequency of the current induced in the motor field winding, means for producing a magnetomotive force that varies with the frequency of the envelope current in the motor armature winding, and means responsive to a given maximum combined effect of said magnetomotive forces for effecting the operation of said field switching means.

2. In a starting system for a synchronous motor, in combination, a synchronous motor having an armature, or primary, winding, a field winding, and a damper winding, a source of alternating current, means for connecting the motor armature winding to said source of alternating current, a source of direct current, field switching means for connecting the motor field winding to the source of direct current to synchronize the synchronous motor, an electromagnetic device having a control armature biased to one position, means set in operation after a predetermined decrease in the motor load current, after the motor armature winding is energized, to decrease the biasing force on the control armature at a constant rate, means for producing a pulsating magnetic control armature actuating force, said pulsating force being produced by the combined action of the slip frequency and the cyclic variations of the envelope current in the motor armature winding, whereby said armature is caused to operate at the first instant that the maximum pulsating magnetic force is equal to or greater than the decreasing biasing force, and means for effecting the operation of the field switching means in response to the operation of said control armature.

3. In a starting system for a synchronous motor, in combination, a synchronous motor having an armature, or primary, winding, a field winding, and a damper winding, a source of alternating current, means for connecting the motor armature winding to said source of alternating current, a source of direct current, field switching means for connecting the motor field winding to the source of direct current to synchronize the synchronous motor, control means for synchronizing said synchronous motor, said control means including means responsive to the combined effect of the frequency of the current induced in the field winding and the frequency of variation of the envelope current in the motor armature winding for closing a switch, and means responsive to the closing of said switch for effecting the operation of said field switching means to connect the synchronous motor field to said source of direct current.

4. In a starting system for a synchronous motor, in combination, a synchronous motor having an armature, or primary, winding, a field winding, and a damper winding, a source of alternating current, means for connecting the motor armature winding to said source of alternating current, a source of direct current, field switching means for connecting the motor field winding to the source of direct current to synchronize the synchronous motor, control means for synchronizing said synchronous motor, said control means including a relay having windings energized by the frequency of the current induced in the field winding during induction motor operation of said motor, windings energized by a current that varies with the envelope current in the armature winding, an armature, a switch actuated by the armature, a spring for biasing the armature to a given position, means for varying the biasing effect of said spring at a constant rate whereby the relay armature is actuated at the first instant, during the changing of the biasing force of the spring, that the combined force of the two magnetic forces of said two windings of said relay are in phase and sufficient to overcome the biasing force of said spring, whereby the relay armature is caused to operate, and means responsive to the operation of the switch controlled by the relay armature for effecting the operation of said field switching means.

5. In a starting system for a synchronous motor, in combination, a synchronous motor having an armature, or primary, winding, a field winding, and a damper winding, a source of alternating current, means for connecting the motor armature winding to said source of alternating current, a source of direct current, field switching means for connecting the motor field winding to the source of direct current to synchronize the synchronous motor, control means for controlling the starting of said synchronous motor, said control means including an electromagnetic device having one winding means energized by the rectified load current of the motor after the motor armature winding is energized with alternating current, whereby a magnetomotive force is produced in the electromagnetic device that varies with the envelope current in the armature winding, that is, varies at twice the slip frequency and having a second winding means energized by the slip frequency of the motor field winding, whereby the total magnetomotive force of the electromagnetic device passes through high values for all the first successive alternate 180 electrical degrees of the slip frequency when the pole pieces of the field winding are in position for maximum pull-in torque, and remains at near zero for all the second successive alternate 180 electrical degrees of the slip frequency, an armature actuable by the electromagnetic device, means for changing the operating characteristics of the armature at a constant rate so that the armature is actuated at an instant when the motor operates near synchronous speed and when the total magnetomotive force passes through one of its maximum values, and means responsive to the actuation of the armature for effecting the operation of said field switching means, whereby said motor is synchronized at maximum pull-in torque.

6. In a starting system for a synchronous motor, in combination, a synchronous motor having an armature, or primary, winding, a field winding, and a damper winding, a source of alternating current, means for connecting the motor armature winding to said source of alternating current, a source of direct current, field switching means for connecting the motor field winding to the source of direct current to synchronize the synchronous motor, control means for synchronizing said synchronous motor, said control means including a current transformer connected to be responsive to the motor load current, a full wave rectifier for rectifying the output of the current transformer, whereby the output current of the rectifier will, during induction motor operation of the motor, vary with a frequency twice that of the frequency of the current induced in the motor field winding, a relay having an energizing winding connected to the output of the rectifier and another winding connected to be energized by the slip frequency that is, the current induced in the motor field winding, whereby the magnetomotive forces produced by the two relay windings are in phase and thus subtractive during each second half cycle of the slip frequency the combined magnetic pull of the relay windings thus varies correspondingly, a relay armature, a spring acting in opposition to the magnetic pull of the relay windings, means for gradually decreasing the effect of the spring whereby the relay armature is actuated at the first instant the magnetic pull becomes greater than the spring force, and means responsive to the actuation of the armature for effecting the operation of the field switching means to synchronize the motor.

7. In a starting control for a synchronous motor, in combination, a conventional synchronous motor, control means responsive to the combined effect of the frequency of the modulations of the armature current during induction motor operation and the frequency of the current induced in the field winding during induction motor operation, a relay having a switch, said relay being responsive to said control means to operate its switch when the pole pieces of the motor field hold a given position with reference to the rotating field in the armature winding, and means for effecting the excitation of the field winding when the switch of said relay is operated.

WILLIAM R. WICKERHAM.